US006914139B2

(12) United States Patent
Mukunoki et al.

(10) Patent No.: US 6,914,139 B2
(45) Date of Patent: Jul. 5, 2005

(54) SOLUTION OF CELLULOSE ACYLATE DISSOLVED IN MIXED SOLVENT OF KETONE AND ESTER

(75) Inventors: Yasuo Mukunoki, Kanagawa (JP); Tsukasa Yamada, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/296,382

(22) PCT Filed: Nov. 9, 2001

(86) PCT No.: PCT/JP01/09827

§ 371 (c)(1), (2), (4) Date: Nov. 25, 2002

(87) PCT Pub. No.: WO02/38666

PCT Pub. Date: May 16, 2002

(65) Prior Publication Data

US 2003/0164115 A1 Sep. 4, 2003

(30) Foreign Application Priority Data

| | | |
|---|---|---|
| Nov. 9, 2000 | (JP) | 2000-341414 |
| Dec. 12, 2000 | (JP) | 2000-377310 |
| Dec. 20, 2000 | (JP) | 2000-386538 |

(51) Int. Cl.[7] .............................. C08L 1/10; B29C 47/00

(52) U.S. Cl. .............................. 536/124; 536/58; 536/76; 536/84; 536/85; 536/86; 536/87; 536/88; 106/170.47; 162/68; 430/641; 264/28

(58) Field of Search .............................. 536/124, 58, 76, 536/85, 86, 88, 84, 87; 106/170–47; 162/68; 430/641; 264/28

(56) References Cited

U.S. PATENT DOCUMENTS 5,783,121 A * 7/1998 Yamazaki et al. ............ 264/28

FOREIGN PATENT DOCUMENTS

| | | | |
|---|---|---|---|
| EP | 723986 | A1 | 7/1996 |
| EP | 943626 | A1 | 12/1998 |
| EP | 943 626 | * | 9/1999 |
| EP | 953592 | A2 | 11/1999 |
| JP | 10-44327 | A | 2/1998 |
| JP | 10-48779 | A | 2/1998 |
| JP | 11-21379 | A | 1/1999 |
| JP | 11-292988 | A | 10/1999 |
| JP | 11-323017 | A | 11/1999 |
| JP | 2000-95876 | A | 4/2000 |

* cited by examiner

*Primary Examiner*—James O. Wilson
*Assistant Examiner*—Devesh Khare
(74) *Attorney, Agent, or Firm*—Sughrue Mion, PLLC

(57) ABSTRACT

In a cellulose acylate solution, cellulose acylate is dissolved in an essentially non-chlorinated solvent. The essentially non-chlorinated solvent is a mixture of a ketone having a solubility parameter of 19 to 21 and an ester having a solubility parameter of 19 to 21. The solution further contains a releasing agent.

15 Claims, No Drawings

SOLUTION OF CELLULOSE ACYLATE DISSOLVED IN MIXED SOLVENT OF KETONE AND ESTER

FIELD OF INVENTION

The present invention relates to a solution in which cellulose acylate is dissolved in a mixed solvent of a ketone and an ester. The invention also relates to a process for preparation of a cellulose acylate film from the cellulose acylate solution.

BACKGROUND OF INVENTION

A cellulose acylate film is used in various photographic or optical elements because it is tough and has enough flame retardant properties. In fact, the cellulose acylate film is a representative photographic support. Further, having an optical isotropy, the film is also used in a liquid crystal display device, which has recently extended its market. In the device, the cellulose acylate film often serves as a protective film of a polarizing plate or a color filter.

A cellulose acylate film is generally produced according to a solvent casting method or a melt casting method. The solvent casting method comprises the steps of casting a solution of cellulose acylate in a solvent (that is called "dope") on a support, and evaporating the solvent to form a film. On the other hand, the melt casting method comprises the steps of heating cellulose acylate to melt, casting the melt on a support, and cooling to form a film. Practically, the solvent casting method is generally adopted because it can form a highly flat film, as compared with the melt casting method.

The solvent casting method is described in various documents. In some recent proposed solvent casting methods, it is aimed to shorten the time between the steps of casting the dope on the support and peeling the formed film off. If the time is shortened, the productivity of the film formation is improved. For examples, Japanese Patent Publication No. 5(1993)-17844 discloses a process of casting a concentrated dope on a cooling drum to shorten the time between the casting step and the peeling step.

The solvent used in the solvent casting method must have functions of not only dissolving cellulose acylate but also forming an excellent film. In more detail, the viscosity and the polymer concentration of the solution (dope) should be appropriately adjusted to form a flat film having a uniform thickness. The dope also should have enough stability to have a long shelf life. Further, the dope should be easily set to gel. Furthermore, the formed film should be easily peeled from the support. In order to satisfy these requirements, the most appropriate solvent must be selected. Moreover, the solvent should be so easily evaporated that it scarcely remains in the film.

Various organic solvents have been proposed as the solvents of cellulose acylate. However, only methylene chloride satisfies all of the above-mentioned requirements. Accordingly, solvents other than methylene chloride have not been practically used.

However, the use of chlorinated solvents such as methylene chloride has been recently restricted severely to protect the global environmental conditions. Further, having a low boiling point (41° C.), methylene chloride vaporizes in the film forming process so easily that it may cause problems in the working environment. Accordingly, the process is conducted under closed conditions. However, there is a technical limitation on sealing methylene chloride in a closed system. Therefore, it is an urgent necessity to search for a new solvent for the cellulose acylate solution in place of methylene chloride.

By the way, acetone is a widely used organic solvent. It has an appropriate boiling point (56° C.), and evaporating acetone does not need a large thermal energy. Further, acetone causes few problems on the human body and the global environmental conditions, as compared with the chlorinated organic solvents. However, cellulose acylate has a poor solubility in acetone. Cellulose acylate having a degree of substitution of not more than 2.70 (acetic acid content: 58.8%) is slightly soluble in acetone but the solubility decreases in accordance with increase of the substitution degree. In fact, cellulose acylate having a degree of substitution of more than 2.70 is almost insoluble in acetone. Cellulose acylate having the substitution degree of not less than 2.80 (acetic acid content: 60.1%) is not soluble in acetone, and is merely swelled in acetone.

J. M. G. Cowie et al. report in Makromol., Chem., 143 (1971) 105, that cellulose acylate having a substitution degree in the range of 2.80 to 2.90 is dissolved in acetone by a specific process. The process comprises the steps of cooling the cellulose acylate (in the reported process the acyl group is restricted to acetyl group) in acetone at a temperature of −80 to −70° C., and warming it to obtain 0.5 to 5 wt. % solution of cellulose acylate in acetone. The method, in which the mixture of cellulose acylate is cooled in an organic solvent to obtain a solution, is hereinafter referred to as "cooling dissolution method".

The solution of cellulose acylate in acetone is also reported by K. Kamide et al., Textile Machinery Society, Vol. 34, pp. 57 (1981). The report (written in Japanese) is entitled "Dry spinning process using acetone solution of triacetyl cellulose". In the report, the cooling dissolution method is applied to the art of fiber spinning. The experiments described in the report examine the mechanical strength, the dyeing property and the sectioned shape of the fiber obtained by the cooling dissolution method. In the report, 10 to 25 wt. % solution of cellulose acetate is used to form a fiber.

A film of cellulose acylate is generally produced by the solvent casting method, which comprises the steps of casting the above-described solution of cellulose acylate (dope) on a support, evaporating the solvent to form a film, and peeling the film from the support. However, the inventors found that, if the dope is prepared from a non-chlorinated solvent, there is a disadvantage in the production.

A non-chlorinated solvent which can dissolve cellulose acylate has a higher boiling point than methylene chloride, which is a chlorinated solvent generally used as a solvent for cellulose acylate. Accordingly, the non-chlorinated solvent evaporates from the cast dope (film) on the support so slowly that it takes relatively long time to dry the film enough to peel off, as compared with methylene chloride. If the film formed from the dope of non-chlorinated solvent is peeled after the same drying time as a film from the methylene chloride dope, peeling stress is so loaded and the solvent so remains that the film is deformed to obtain an uneven surface.

SUMMARY OF THE INVENTION

An object of the present invention is to provide a cellulose acylate solution which has an excellent storing stability and which is prepared without a chlorinated organic solvent such as methylene chloride.

Another object of the invention is to provide a cellulose acylate film which has an even surface and which is easily peeled from a support in the production process without a chlorinated organic solvent such as methylene chloride.

The present invention provides a solution of cellulose acylate dissolved in an essentially non-chlorinated solvent, wherein the essentially non-chlorinated solvent is a mixture of a ketone and an ester, said ketone having a solubility parameter of 19 to 21, said ester having a solubility parameter of 19 to 21, and said solution further containing a releasing agent.

The invention also provides a process for the preparation of cellulose acylate film, wherein a film is formed from a solution of cellulose acylate dissolved in an essentially non-chlorinated solvent, said essentially non-chlorinated solvent being a mixture of a ketone and an ester, said ketone having a solubility parameter of 19 to 21, said ester having a solubility parameter of 19 to 21, and said solution further containing a releasing agent.

DETAILED DESCRIPTION OF THE INVENTION

Cellulose, which is a material of cellulose acylate, can be prepared from cotton linter or wood pulp. Cellulose acylate obtained from any cellulose material can be used in the invention, and cellulose acylate from a mixture of some cellulose materials is also usable. The cellulose acylate used in the invention has an acetyl group and an acyl group having 3 to 22 carbon atoms. Examples of the acyl group having 3 to 22 carbon atoms include propanoyl ($C_2H_5CO-$), butanoyl ($C_3H_7CO-$) (n-, iso-), valeroyl ($C_4H_9CO-$) (n-, iso-, sec-, tert-), octanoyl, dodecanoyl, octadecanoyl and oleoloyl. Propanoyl and butanoyl are preferred.

Cellulose triacetate is particularly preferred.

Cellulose acylate can be prepared by acylation of cellulose with an acylating agent. In the case where acetic anhydride or acid chloride is used as the acylating agent, an organic solvent is preferably used as a reaction solvent. Examples of the organic solvent include organic acids (e.g., acetic acid) and methylene chloride.

Cellulose acylate preferably contains acyl groups substituting for hydroxyls in a substitution degree of 2.6 to 3.0. Cellulose acylate has a (viscosity average) degree of polymerization in the range of preferably 200 to 700, more preferably 250 to 550. A commercially available cellulose acylate (for example, available from Daicel Chemical Industries Ltd., Cortles, Hext or Eastman Kodak) is also usable, and in that case photographic grade is preferred. Water content of cellulose acylate is preferably not more than 2 wt. %.

The cellulose acylate film is preferably formed by the solvent casting method. In the method, the film is formed from a dope in which cellulose acylate is dissolved in an organic solvent. As the organic solvent, a mixture of ketone and ester is used. Each of the ketone and the ester has a solubility parameter of 19 to 21. The ketone and the ester may have cyclic structures. The ketone may have a functional group other than carbonyl, and the ester may have a functional group other than ester bonding.

Examples of the ketone include acetone (20.3), methyl ethyl ketone (19.0), diethyl ketone (18.2), diisobutyl ketone (18.0), cyclopentanone (20.9), cyclohexanone (20.3) and methyl cyclohexanone (20.1). Each of the above numbers in parentheses represents a solubility parameter of each solvent. Acetone, cyclopentanone and cyclohexanone are particularly preferred.

Examples of the ester include ethyl formate (19.2), propyl formate (18.4), n-pentyl formate (18.1), methyl acetate (19.6), ethyl acetate (18.2) and n-pentyl acetate (17.6). Each of the above numbers in parentheses represents a solubility parameter of each solvent. Methyl formate, ethyl formate and methyl acetate are particularly preferred.

The solubility parameter of solvent is defined by the formula: $(\Delta H/V)^{1/2}$ in which $\Delta H$ is a molar heat of vaporization and V is a molar volume of the solvent. The less different solubility parameters two solvents have, the more they are mixed.

The solubility parameter is described in various publications (e.g., J. Brandrup, E. H. et al., "Polymer handbook" [4th edition], VII/671 to VII/714) in detail.

An essentially non-chlorinated solvent is used in the solution of the invention. Although even a chlorinated solvent can be used from the technical viewpoint, it is not preferred in consideration of global environment and working environment. Preferably, the organic solvent (mixture of solvents) used in the invention essentially contains no chlorinated solvent. Here, the term "essentially non-chlorinated" means that the content of chlorinated solvent is less than 10 wt. % (preferably, less than 5 wt. %). Preferably, any chlorinated solvent such as, methylene chloride is not found in the produced cellulose acylate film.

Besides the ketone and the ester, an alcohol can be used. Examples of the alcohol include methanol, ethanol, 1-propanol, 2-propanol, 1-butanol, 2-butanol, cyclohexanol, 2-fluoroethanol and 2,2,2-trifluoroethanol. Particularly preferred alcohols are methanol, ethanol, 1-propanol, 2-propanol and 1-butanol.

Practically, the mixture of solvents preferably contains the ketone and the ester in an amount of 70 wt. % or more. The content of the alcohol is preferably in the range of 2 to 30 wt. %.

Examples of the combination of the solvents include methyl acetate/cyclopentanone/acetone/methanol/ethanol (60/15/15/5/5, by weight), methyl acetate/acetone/methanol/ethanol (75/15/5/5, by weight), methyl acetate/cyclohexanone/methanol/1-butanol (70/20/5/5, by weight), and methyl formate/methyl ethyl ketone/acetone/methanol/ethanol (50/20/20/5/5). Particularly preferred combinations are methyl acetate/acetone/methanol/ethanol (75/15/5/5, by weight) and methyl acetate/cyclopentanone/methanol/ethanol (80/10/5/5, by weight).

For preparing the cellulose acylate solution, first the cellulose acylate is added to the mixture of solvents in a tank while stirred at room temperature, so as to swell with the solvent. The time for swelling is at least 10 minutes, and if it is less than 10 minutes some insoluble residues often remain. Further, for swelling the cellulose acylate well, the solvent is preferably kept at 0 to 40° C. If the temperature is lower than 0° C., the swelling speed is so slow that insoluble residues are liable to remain. On the other hand, if it is higher than 40° C., the cellulose acylate is swelled so rapidly that the inside is not fully swelled.

After swelling, the cellulose acylate is preferably dissolved according to the cooling dissolution method, the high temperature dissolution method or a combination thereof.

In the cooling dissolution method, first the cellulose acylate is gradually added while stirred into the organic solvent at room temperature (−10 to 40° C.). If two or more solvents besides the ketone and the ester are used, the order for addition is not restricted. For example, after the cellulose acylate is added to a first solvent, other solvents (for example, gelatin solvent such as alcohol) may be added. Otherwise, the cellulose acylate may be beforehand wetted with the gelatin solvent, and then other solvents may be added. This process is effective in prohibiting inhomogeneous dissolution. The amount of cellulose acylate is preferably in the range of 10 to 40 wt. % based on the amount of the mixture. The amount is more preferably in the range of 10 to 30 wt. %. Other optional additives described below may be added to the mixture.

At the next stage, the mixture is cooled to a temperature of −100 to −10° C., preferably −80 to −10° C., more preferably −50 to −20° C., and most preferably −50 to −30° C. The mixture can be cooled in a dry ice/methanol bath (−75° C.) or in a cooled diethylene glycol solution (−30 to −20° C.). The faster the cooling rate is, the more preferred it is. The cooling rate is preferably 100° C./second or more. A sealed vessel is preferably used to prevent contamination of water, which is caused by dew condensation at the cooling step.

After cooling, the mixture is warmed to a temperature of 0 to 200° C. (preferably 0 to 150° C., more preferably 0 to 120° C., most preferably 0 to 50° C.) to dissolve the cellulose acetate in the solvent. For warming the mixture, it may be left at room temperature or in a hot bath. The time for the cooling and warming steps can be shortened by conducting the cooling step under a high pressure and conducting the warming step under a low pressure. A pressure vessel is preferably used under a high or low pressure.

The cooling and warming steps can be repeated twice or more.

In the high temperature dissolution method, the cellulose acylate is gradually added while stirred into the organic solvent at room temperature (−10 to 40° C.). If two or more solvents besides the ketone and the ester are used, the order for addition is not restricted. For example, after the cellulose acylate is added to a first solvent, other solvents (for example, gelatin solvent such as alcohol) may be added. Otherwise, the cellulose acylate may be beforehand wetted with the gelatin solvent, and then other solvents may be added. This process is effective in prohibiting inhomogeneous dissolution. For preparing the cellulose acylate solution, the cellulose acylate is preferably added to a mixed organic solvent comprising various solvents so as to beforehand swell the cellulose acylate. In that process, the cellulose acylate may be gradually added while stirred into one of the solvents at −10 to 40° C., or otherwise if necessary the cellulose acylate may be beforehand swelled with a particular solvent and then the other solvents may be added to prepare a homogeneous swelling liquid. Further, the cellulose acylate also may be swelled with two or more solvents, and then the other solvents may be added.

The content of cellulose acylate is in the range of preferably 5 to 30 wt. %, more preferably 15 to 30 wt. %, further preferably 17 to 25 wt. %.

The cellulose acylate and the mixed solvent are heated in a pressure vessel under a high pressure of 0.2 to 30 Mpa in the temperature range of 70 to 240° C., preferably 80 to 220° C., more preferably 100 to 200° C., most preferably 100 to 190° C.

After heating, the mixture is cooled below the lowest boiling point of the used solvents. Generally, the mixture is cooled to −10 to 50° C. so that the pressure may be reduced to atmospheric pressure. For cooling the mixture, it may be left at room temperature or in a cool bath.

The warming and cooling steps can be repeated twice or more.

If necessary, first the cellulose acylate solution may be prepared in such a low concentration that cellulose acylate can be easily dissolved, and then the solution may be concentrated by concentrating means. In preparing the cellulose acylate solution, the reaction vessel is preferably filled with an inert gas such as nitrogen so as to prevent explosion. Immediately before forming the film, the cellulose acylate solution is to be viscous enough to form the film by casting. The viscosity is adjusted in the range of preferably 10 to 2,000 Pa·s, more preferably 30 to 400 Pa·s. The temperature in casting for forming the film is not particularly restricted, but is preferably in the range of −5 to 70° C., more preferably in the range of −5 to 55° C. The content of cellulose acylate in the solution is in the range of preferably 5 to 40 wt. %, more preferably 10 to 30 wt. %.

In preparing the cellulose acylate solution, various additives can be added to the solution in each step. Examples of the additives include plasticizer, ultraviolet absorber and deterioration inhibitors (e.g., oxidation inhibitor, peroxide decomposer, radical inhibitor, metal inactivating agent, oxygen scavenger, amine).

Examples of the plasticizer include triphenyl phosphate (TPP), diphenylbiphenyl phosphate, tricresyl phosphate (TCP), dioctyl phthalate (DOP), acetyltributyl citrate (OACTB) and acetyltriethyl citrate. Further, plasticizers reducing optical anisotropy may be used. Examples of the optical anisotropy-reducing plasticizer include (di) pentaerythritol esters (described in Japanese Patent Provisional Publication No. 11(1999)-124445), glycerol esters (described in Japanese Patent Provisional Publication No. 11(1999)-246704), diglycerol esters (described in Japanese Patent Provisional Publication No. 2000-63560), citrate esters (described in Japanese Patent Provisional Publication No. 11(1999)-92574), and substituted phenylphosphate esters (described in Japanese Patent Provisional Publication No. 11(1999)-90946). Two or more plasticizers may be used in combination. The amount of plasticizer is in the range of preferably 5 to 30 wt. %, more preferably 8 to 16 wt. % based on the amount of cellulose acylate.

The ultraviolet absorber and the deterioration inhibitor are described in Japanese Patent Provisional Publication Nos. 60(1985)-235852, 3(1991)-199201, 5(1993)-1907073, 5(1993)-194789, 5(1993)-271471, 6(1994)-107854, 6(1994)-118233, 6(1994)-148430, 7(1995)-11056, 7(1995)-11055, 8(1996)-29619, 8(1996)-239509 and 2000-204173. Examples of the deterioration inhibitor include butylated hydroxytoluene (BHT). The ultraviolet absorber is preferably excellent in absorbing ultraviolet light in the wavelength region shorter than 370 nm, and at the same time preferably absorbs less amount of visible light in the wavelength region longer than 400 nm. Examples of the ultraviolet absorber include oxybenzophenone compounds, benzotriazole compounds, salicylate ester compounds, benzophenone compounds, cyanoacrylate compounds, and nickel complex salts. Benzotriazole compounds and benzophenone compounds are preferred. The amount of ultraviolet absorber is in the range of preferably 1 to 10,000 ppm, more preferably 10 to 1,000 ppm by weight, based on the amount of cellulose acylate.

The retardation in plane (Re) of the film is preferably in the range of 0 to 300 nm. The retardation along the thickness (Rth) of the film is in the range of preferably 0 to 600 nm, more preferably 0 to 400 nm, most preferably 0 to 250 nm, per 100 μm thickness.

The cellulose acylate solution can contain, as a releasing agent, an acid having an acid dissociation constant (pKa) of 1.93 to 4.50 in water or its salt with alkali metal or alkaline earth metal. The acid or salt serves as a releasing agent.

Either inorganic or organic acids can be used as the above acid.

Examples of the inorganic acids include $HClO_2$ (2.31), HOCN (3.48), molybdic acid $H_2MoO_4$ (3.62), $HNO_2$ (3.15), phosphoric acid $H_3PO_4$ (2.15), triphosphoric acid $H_5P_3O_{10}$ (2.0) and vanadic acid $H_3VO_4$ (3.78). Each of the above numbers in parentheses represents an acid dissociation constant (pKa) of each acid in water. (In the following description, each number in parentheses also represents the acid dissociation constant (pKa) of each acid.)

Typical organic acids are carboxylic acids, sulfonic acids and phosphoric acids.

Examples of the carboxylic acids include aliphatic monocarboxylic acids, aliphatic polycarboxylic acids, oxycarboxylic acids, aldehydic acids, ketonic acids, aromatic monocarboxylic acids, aromatic polycarboxylic acids, heterocyclic monocarboxylic acids, heterocyclic polycarboxylic acids and amino acids.

Examples of the aliphatic monocarboxylic acids include formic acid (3.55). oxalacetic acid (2.27), cyanoacetic acid (2.47), phenylacetic acid (4.10), phenoxyacetic acid (2.99), fluoroacetic acid (2.59), chloroacetic acid (2.68). bromoacetic acid (2.72), iodoacetic acid (2.98), mercaptoacetic acid (3.43). vinylacetic acid (4.12), chloropropionic acid (2.71–3.92), 4-aminobutyric acid (4.03) and acrylic acid (4.26).

Examples of the aliphatic polycarboxylic acids include malonic acid (2.65), succinic acid (4.00), glutaric acid (4.13), adipic acid (4.26), pimelic acid (4.31), azelaic acid (4.39) and fumaric acid (2.85).

Examples of the oxycarboxylic acids include glycolic acid (3.63), lactic acid (3.66), malic acid (3.24), tartaric acid (2.82–2.99) and citric acid (2.87).

Examples of the aldehydic acids include glyoxylic acid (3.18).

Examples of the ketonic acids include pyruvic acid (2.26) and levulinic acid (4.44).

Examples of the aromatic monocarboxylic acids include anilinesulfonic acid (3.74–3.23), benzoic acid (4.20), aminobenzoic acid (2.02–3.12), chlorobenzoic acid (2.92–3.99), cyanobenzoic acid (3.60–3.55), nitrobenzoic acid (2.17–3.45), hydroxybenzoic acid (4.08–4.58), anisic acid (4.09–4.48), fluorobenzoic acid (3.27–4.14), chlorobenzoic acid, bromobenzoic acid (2.85–4.00), iodobenzoic acid (2.86–4.00), salicylic acid (2.81), naphthoic acid (3.70–4.16), cinnamic acid (3.88) and mandelic acid (3.19).

Examples of the aromatic polycarboxylic acids include phthalic acid (2.75), isophthalic acid (3.50) and terephthalic acid (3.54).

Examples of the heterocyclic monocarboxylic acids include nicotinic acid (2.05) and 2-furancarboxylic acid (2.97).

Examples of the heterocyclic polycarboxylic acids include 2,6-pyridinedicarboxylic acid (2.09).

The above-described amino acids include not only normal amino acids but also amino acid derivatives (substituted amino acids and oligopeptides). Examples of the amino acids include asparagine (2.14), aspartic acid (1.93), adenine (4.07), alanine (2.30), β-alanine (3.53), arginine (2.05), isoleucine (2.32), glycine (2.36), glutamine (2.17), glutaminic acid (2.18), serine (2.13), tyrosine (2.17), tryptophan (2.35), threonine (2.21), norleucine (2.30), valine (2.26), phenylalanine (2.26), methionine (2.15), lysine (2.04), leucine (2.35), adenosine (3.50). adenosine triphosphate (4.06), adenosine phosphate (3.65–3.80), L-alanyl-L-alanine (3.20), L-alanylglycine (3.10), β-alanylglycine (3.18), L-alanylglycylglycine (3.24), β-alanylglycylglycine (3.19), L-alanylglycylglycylglycine (3.18), glycyl-L-alanine (3.07), glycyl-β-alanine (3.91), glycylglycyl-L-alanine (3.18), glycylglycylglycine (3.20), glycylglycylglycylglycine (3.18), glycylglycyl-L-histidine (2.72), glycylglycylglycyl-L-histidine (2.90), glycyl-DL-histidylglycine (3.26), glycyl-L-histidine (2.54), glycyl-L-leucine (3.09), γ-L-glutamyl-L-cysteinylglycine (2.03), N-methylglycine (sarcosine, 2.20), N,N-dimethylglycine (2.08), citrulline (2.43), 3,4-dihydroxyphenylalanine (2.31), L-histidylglycine (2.84), L-phenylalanylglycine (3.02), L-prolylglycine (3.07) and L-leucyl-L-tyrosine (3.15).

Sulfonic and phosphoric materials, as well as carboxylic acids, can be also used as the releasing agent. In consideration of solubility, those materials are preferably in the form of surface active agent. Japanese Patent Provisional publication No. 61(1986)-243837 describes preferred materials.

Organic acids preferably used as the releasing agent are aliphatic monocarboxylic acids having 1 to 3 carbon atoms (e.g., formic acid, chloroacetic acid, halopropionic acid, acrylic acid), aliphatic polycarboxylic acids having 2 to 4 carbon atoms (e.g., malonic acid, succinic acid, glutaric acid, fumaric acid), oxycarboxylic acids having 1 to 6 carbon atoms (e.g., glycolic acid, lactic acid, malic acid, tartaric acid, citric acid) and amino acids (including derivatives thereof). Further, sulfonic and phosphoric surface active agents described in Japanese Patent Provisional publication No. 61(1986)-243837) are also preferred releasing agents.

The above acids may be in the form of not free acids but salts with alkali metals or alkaline earth metals. Examples of the alkali metals include lithium, potassium and sodium. Sodium is particularly preferred. Examples of the alkaline earth metals include calcium, magnesium, barium and strontium. Calcium and magnesium are particularly preferred. Alkali metals are preferred to alkaline earth metals. Two or more alkali metals or alkaline earth metals can be used in combination. Both alkali metals and alkaline earth metals can be used in combination.

The total amount of the acids or salts is determined so as to realize satisfying releasing and enough transparency. The amount is in the range of preferably $1 \times 10^{-9}$ to $3 \times 10^{-5}$ mol, more preferably $1 \times 10^{-8}$ to $2 \times 10^{-5}$ mol, further preferably $1 \times 10^{-7}$ to $1.5 \times 10^{-5}$ mol, furthermore preferably $5 \times 10^{-7}$ to $1 \times 10^{-5}$ mol, most preferably $6 \times 10^{-7}$ to $8 \times 10^{-6}$ mol.

The compounds represented by the following formula (1) or (2) can be also used as the releasing agent.

$$(R1\text{-}B1\text{-}O)_{n1}\text{—}P(\text{=}O)\text{-}(OM1)_{n2} \quad (1)$$

$$R2\text{-}B2\text{-}X \quad (2)$$

[in which each of R1 and R2 is independently a substituted or non-substituted alkyl, alkenyl, aralkyl or aryl group having 4 to 40 carbon atoms; M1 is an alkali metal, an ammonia or a lower alkylamine; each of B1 and B2 is independently a divalent linking group; X is a carboxylic acid or a salt thereof, a sulfonic acid or a salt thereof, or a sulfuric ester or a salt thereof; n1 is an integer of 1 or 2; and n2 is an integer of 3-n1].

Preferred examples of R1 and R2 include substituted or non-substituted alkyl groups having 4 to 40 carbon atoms (e.g., butyl, hexyl, octyl, 2-ethylhexyl, nonyl, docecyl, hexadecyl, octadecyl, eicosanyl, docosanyl, myricyl), substituted or non-substituted alkenyl groups having 4 to 40 carbon atoms (e.g., 2-hexenyl, 9-decenyl, oleyl), and substituted or non-substituted aryl groups having 4 to 40 carbon atoms (e.g., phenyl, naphthyl, methylphenyl, dimethylphenyl, trimethylphenyl, ethylphenyl, propylphenyl, diisopropylphenyl, triisopropylphenyl, t-butylphenyl, di-tbutylphenyl, tri-t-butylphenyl, isopentylphenyl, octylphenyl, isooctylphenyl, isononylphenyl, diisononylphenyl, dodecylphenyl, isopentadecylphenyl).

More preferred alkyl groups are hexyl, octyl, 2-ethylhexyl, nonyl, docecyl, hexadecyl, octadecyl and docosanyl. A more preferred alkenyl group is oleyl. More preferred aryl groups are phenyl, naphthyl, trimethylphenyl, diisopropylphenyl, triisopropylphenyl, di-t-butylphenyl, tri-t-butylphenyl, isooctylphenyl, isononylphenyl, diisononylphenyl and dodecylphenylisopentadecylphenyl.

The divalent linking group represented by B1 or B2 is, for example, an alkeylene group having 1 to 10 carbon atoms, a polyoxyethylene (polymerization degree: 1 to 50), a polyoxypropylene (polymerization degree: 1 to 50), a polyoxyglycerin (polymerization degree: 1 to 50) and a combination thereof. Preferred examples of the linking group include methylene, ethylene, propylene, butylenes, polyoxyethylenes (polymerization degree: 1 to 25), polyoxypropylenes (polymerization degree: 1 to 25) and polyoxyglycerins (polymerization degree: 1 to 15). In the above formulas, X is a carboxylic acid (or a salt thereof), a sulfonic acid (or a salt thereof) or a sulfuric ester (or a salt thereof). A sulfonic acid (or a salt thereof) or a sulfuric ester (or a salt thereof) is particularly preferred. The counter ion of the salt is preferably Na, K, ammonium, trimethylamine or triethanolamine.

Examples of the compound represented by the formula (1) or (2) are shown below.

| | |
|---|---|
| RZ-1 | $C_8H_{17}O\text{—}P(\text{=}O)\text{—}(OH)_2$ |
| RZ-2 | $C_{12}H_{25}O\text{—}P(\text{=}O)\text{—}(OK)_2$ |
| RZ-3 | $C_{12}H_{25}OCH_2CH_2O\text{—}P(\text{=}O)\text{—}(OK)_2$ |
| RZ-4 | $C_{15}H_{31}(OCH_2CH_2)_5O\text{—}P(\text{=}O)\text{—}(OK)_2$ |
| RZ-5 | $\{C_{12}H_{25}O(CH_2CH_2O)_5\}_2\text{—}P(\text{=}O)\text{—}OH$ |
| RZ-6 | $\{C_{18}H_{35}(OCH_2CH_2)_8O\}_2\text{—}P(\text{=}O)\text{—}ONH_4$ |
| RZ-7 | $(t\text{-}C_4H_9)_3\text{—}C_6H_2\text{—}OCH_2CH_2O\text{—}P(\text{=}O)\text{—}(OK)_2$ |
| RZ-8 | $(iso\text{-}C_9H_{19}\text{—}C_6H_4\text{—}O\text{—}(CH_2CH_2O)_5\text{—}P(\text{=}O)\text{—}(OK)(OH)$ |
| RZ-9 | $C_{12}H_{25}SO_3Na$ |

-continued

| | |
|---|---|
| RZ-10 | $C_{12}H_{25}OSO_3Na$ |
| RZ-11 | $C_{17}H_{33}COOH$ |
| RZ-12 | $C_{17}H_{33}COOH.N(CH_2CH_2OH)_3$ |
| RZ-13 | $iso\text{-}C_8H_{17}\text{—}C_6H_4\text{—}O\text{—}(CH_2CH_2O)_3\text{—}(CH_2)_2SO_3Na$ |
| RZ-14 | $(iso\text{-}C_9H_{19})_2\text{—}C_6H_3\text{—}O\text{—}(CH_2CH_2O)_3\text{—}(CH_2)_4SO_3Na$ |
| RZ-15 | Sodium triisopropylnaphthalenesulfanate |
| RZ-16 | Sodium tri-t-butylnaphthalenesulfonate |
| RZ-17 | $C_{17}H_{33}CON(CH_3)CH_2CH_2SO_3Na$ |
| RZ-18 | $C_{12}H_{25}\text{—}C_6H_4SO_3.NH_4$ |

The amount of the compound represented by the formula (1) or (2) is in the range of preferably 0.002 to 2 wt. %, more preferably 0.005 to 1 wt. %, further preferably 0.01 to 0.5 wt. % based on the weight of the solution. It is not particularly restricted how the compound is added. The compound in the normal form (solid or liquid) may be added together with other components to prepare the cellulose acylate solution, or otherwise the compound may be added later to the beforehand prepared cellulose acylate solution.

In order to reduce friction of the resultant film, fine particles may be added as a matting agent. As the fine particles, inorganic materials are preferred. Examples of the inorganic materials for the fine particles include silica, kaolin, talc, diatomaceous earth, quartz, calcium carbonate, barium sulfate, titanium oxide, alumina, manganese colloid, titanium dioxide, strontium barium sulfate and silicon dioxide. The inorganic particles may be prepared from salts of alkaline earth metals (e.g., calcium, manganese). The particles form fine projections on the film to make the surface rough, and the average height of the projections is in the range of preferably 0.005 to 10 $\mu$m. more preferably 0.01 to 5 $\mu$m. The projections can be made of the matting agent of spherical or irregular particles. The amount of the fine particles is in the range of preferably 0.5 to 600 mg/m$^2$, more preferably 1 to 400 mg/m$^2$.

Before casting, the cellulose acylate solution (dope) is preferably filtrated through a proper filter (e.g., wire net, paper, flannel) to remove foreign substances (precipitated or suspended excess solute, dregs, impurities). The filter preferably has an absolute filtration precision of 0.05 to 100 $\mu$m, more preferably 0.5 to 10 $\mu$m. The pressure for filtration is in the range of preferably not more than 16 kg/cm$^2$, more preferably not more than 12 kg/cm$^2$, further preferably not more than 10 kg/cm$^2$, and most preferably not more than 2 kg/cm$^2$.

The cellulose acylate film can be prepared by the conventional process and apparatus for the preparation of cellulose acylate film according to the solvent casting method. For example, first the dope (cellulose acylate solution) prepared in a dissolving tank (pot) is introduced into a stock tank to defoam. The thus finally prepared dope is then sent from an outlet to a pressure die through a quantitative gear pump of pressing type, which can quantitatively send the liquid very preciously, for example, according to rotation of the gear. From a slit of the pressure die, the dope is evenly cast on a support running endlessly. When the endless support once rotates and a beforehand determined peeling point is seen, the insufficiently dried dope film (which is referred to as "web") is peeled from the support. While both sides of the web are fixed with clips to keep the width, the web is transferred and dried with a tenter. The web is then successively dried and transferred with rollers of a drying means to complete drying, and wound up by a winder in a predetermined length. The combination of the tenter and the rollers of drying means varies according to the aims of the film. In the case where the film used for a silver halide photographic material or a protective film of electric display is prepared by the solvent casting method, not only the above solvent cast apparatus but also a coating means for an undercoating layer, an antistatic layer, an antihalation layer and a protrective layer is often used.

In that case, two or more cellulose acylate solutions are cooperatively cast on a smooth band or drum (support) to form two or more layers. For example, two or more outlets are arranged at intervals along the running direction of the support, and from each outlet each cellulose acylate solution is cast to form a layered film (Japanese Patent Provisional publication No. 11(1999)-198285). Otherwise, cellulose acylate solutions may be cast from two outlets to form a film (Japanese Patent Provisional publication No. 6(1994)-134933). Further, a flow of high-viscous cellulose acylate solution may be enclosed with a flow of low-viscous one to form a layered flow, and the high- and low-viscous solutions in the layered flow may be simultaneously extruded to produce a film (Japanese Patent Provisional publication No. 56(1981)-162617). Through the cooperative casting process, the surface of the film is dried to be smooth and consequently the resultant film has a considerably improved surface. The thickness of each layer formed by cooperative casting is not particularly restricted, but preferably the surface layer is thinner than inner layers. The surface layer has a thickness of preferably 1 to 50 $\mu$m, more preferably 1 to 20 $\mu$m. Here, the term "surface layer" means a layer not facing the band (or drum) in a two-layered film, or the top or bottom layer in a three- or more-layered film. The term "inner layer" means a layer facing the band (or drum) in a two-layered film, or the layer positioned inside in a three- or more-layered film.

The cellulose acylate solution for forming the surface layer preferably has a viscosity not higher than (the same as or lower than) those for the inner layers. Further, the solution for forming the surface layer preferably has a cellulose acylate concentration not higher than (the same as or lower than) those for the inner layers. The ratio of the cellulose acylate concentration of the solution for the surface layer based on the concentrations of those for the inner layers is preferably in the range of 0.99 to 0.80.

The cellulose acylate solution can be cast simultaneously with coating solutions for other functional layers (e.g., adhesive layer, dye layer, antistatic layer, antihalation layer, UV absorbing layer, polarizing layer).

The dope cast on the support is dried at a temperature of preferably 30 to 250° C., more preferably 40 to 180° C. The temperature for drying is described in Japanese Patent Publication No. 5(1993)-17844. The film may be laterally stretched (according to the description in Japanese Patent Provisional publication Nos. 62(1987)-115035, 4(1992)-152125, 4(1992)-284211, 4(1992)-298310 and 11(1999)-48271). When the film is stretched, monoaxial or biaxial stretching is carried out. The stretching ratio (ratio of the extended length to the original length) is preferably in the range of 10 to 30%.

The resultant (dried) film has a thickness of preferably 5 to 500 $\mu$m, more preferably 20 to 250 $\mu$m, most preferably 30 to 180 $\mu$m. If the film is used for an optical device, the thickness is particularly preferably in the range of 30 to 110 $\mu$m. The thickness can be controlled by adjusting the solid content of the dope, the width of the die slit, the extruding speed from the die, and the moving speed of the support.

The cellulose acylate film may be subjected to surface treatment to improve adhesion between each functional layer (e.g., adhesive layer, backing layer) and the film. Examples of the surface treatment include glow discharge treatment, corona discharge treatment, ultraviolet (UV) treatment, flame treatment, and acid or alkali treatment). The alkali (saponification) treatment is preferred.

The alkali (saponification) treatment preferably comprises the steps of immersing the film surface in an alkali solution, neutralizing with an acidic solution, washing with water and drying. Examples of the alkali solution include aqueous solutions of potassium hydroxide and sodium hydroxide. The normality of hydroxide ion is in the range of preferably 0.1 to 3.0 N, more preferably 0.5 to 2.0 N. The temperature of the alkali solution is in the range of preferably room temperature to 90° C., more preferably 30 to 70° C. After immersed in the alkali solution, the film is washed with water and immersed in an acidic solution. The cellulose acylate film is then washed with water to complete the surface treatment. Examples of the acid include hydrochloric acid, nitric acid, sulfuric acid, acetic acid, formic acid, chloroacetic acid and oxalic acid. The normality thereof is in the range of preferably 0.01 to 3.0 N, more preferably 0.05 to 2.0 N. In order to ensure adhesion between the cellulose acylate film and the functional layers, an undercoating layer: (adhesive layer) is preferably provided on the film before the functional layers are provided thereon.

In the case where the cellulose acylate film is used as a protective film of polarizing plate, the film preferably has at least one antistatic layer containing electrically conductive material or a hydrophilic binder layer for adhesion onto the polarizer. As the conductive material, conductive metal oxides or polymers are preferred. Further, a transparent conductive membrane may be formed by vapor deposition or sputtering. The conductive layer (antistatic layer) may be the surface layer or the inner layer. The conductive layer has a resistance of preferably $10^0$ to $10^{12}$ $\Omega$, more preferably $10^0$ to $10^{10}$ $\Omega$. As the conductive material, metal oxides are preferred. Examples of the metal oxides include $ZnO$, $TiO_2$, $SnO_2$, $Al_2O_3$, $In_2O_3$, $SiO_2$, $MgO$, $BaO$, $MoO_2$, $V_2O_5$ and complex oxides. Preferred oxides are $ZnO$, $SnO_2$ and $V_2O_5$. Examples of the conductive ionic polymer include an anionic polymer having dissociating groups at the main chain and a cationic polymer of pendant type having cationic dissociating groups at the side chain. As the conductive material, organic electrically conductive material is preferred. Examples of the electrically conductive material include polyaniline derivatives, polythiophene derivatives, polypyrrole derivatives and polyacetylene derivatives.

A surface active agent is preferably contained in one or more of the functional layers on the celluloce acylate film. As the surface active agent, a nonionic, cationic or betaine surface active agent is preferred. A fluorine-containing surface active agent is also usable. The surface active agent in the organic solvent can work as a coating agent or an antistatic agent.

A slipping agent is preferably contained in one or more of the layers on the cellulose acylate film. Examples of the slipping agent include polyorganosiloxane (described in Japanese Patent Publication No. 53(1978)-292), amides of higher fatty acids (described in U.S. Pat. No. 4,275,146), and esters of higher fatty acids (described in British Patent No.

927,446, Japanese Patent Publication No. 58(1983)-33541 and Japanese Patent Provisional Publication Nos. 55(1980)-126238 and 58(1983)-90633). The above esters of higher fatty acids are esters derived from fatty acids having 10 to 24 carbon atoms and alcohols having 10 to 24 carbon atoms.

The cellulose acylate film prepared from the cellulose acylate solution has various uses.

The cellulose acylate film is particularly suitable for an optical compensatory sheet in a liquid crystal display. The cellulose acylate film itself can be directly used as the optical compensatory sheet. In that case, the polarizing element (described below) and the compensatory sheet of cellulose acylate film are preferably placed so that the transparent axis of the element may be essentially parallel or perpendicular to the slow axis of the sheet. The placement of the element and the sheet is described in Japanese Patent Provisional Publication No. 10(1998)-48420. The liquid crystal display comprises two polarizing elements and a liquid crystal cell provided between them. The liquid crystal cell comprises a pair of electrode substrates and a liquid crystal layer placed between them. In the display, at least one optical compensatory sheet is placed between the liquid crystal cell and the polarizing element. For forming the liquid crystal layer in the cell, some spacers are usually placed between the two substrates to make a space, in which liquid crystal molecules are enclosed. The electrode substrate is a substrate on which a transparent electrode layer containing electrically conductive material is provided. Further, the liquid crystal cell may have a gas-barrier layer, a hard coating layer or an under-coating layer (for adhesion to the transparent electrode layer). These layers are usually provided on the substrate. The substrate generally has a thickness of 80 to 500 μm.

The optical compensatory sheet is a birefringent film for preventing a displayed image from undesirable coloring. The cellulose acylate film can be used as the optical compensatory sheet. The compensatory sheet may be a biaxially stretched cellulose acylate film, and may have an antireflection layer, an antiglare layer and/or a λ/4 layer. Further, in order to enlarge a viewing angle of the liquid crystal display, the cellulose acylate film can be laminated on a film having birefringence opposite (in relation to positive/negative) to that of the cellulose acylate film to prepare the optical compensatory sheet. The thickness of the compensatory sheet is preferably in the above-described range of preferred thickness of the film.

Examples of the polarizing membrane in the polarizing element include an iodine polarizing membrane, a polyene polarizing membrane and a dichromatic dye polarizing membrane. Each membrane is generally made of polyvinyl alcohol. The protective film of the polarizing plate has a thickness of preferably 25 to 350 μm, more preferably 30 to 200 μm.

The liquid crystal display may have a surface-treated layer, which includes a hard coating layer, an antifogging layer and an antireflection layer. As described above, an optical compensatory sheet, in which an optically anisotropic layer containing liquid crystal molecules (particularly, discotic ones) is provided on a support, is proposed (in Japanese Patent Provisional Publication Nos. 3(1991)-9325, 6(1994)-148429, 8(1996)-50206 and 9(1997)-26572). The cellulose acylate film can be used as the support of such optical compensatory sheet.

The cellulose acylate film is advantageously used as the support of the optical compensatory sheet for a liquid crystal display of VA type having a liquid crystal cell of VA mode, a display of OCB type having a liquid crystal cell of OCB mode, a display of HAN type having a liquid crystal cell of HAN mode, or a display of ASM (axially symmetric aligned microcell) type having a liquid crystal cell of ASM mode.

In the below-described examples, chemical and physical properties of the prepared cellulose acylate solutions and films were measured or estimated in the following manners.
(0) Substitution Degree (%) of Cellulose Acylate The acetic acid content was measured according to saponification method. The sample of dried cellulose acylate was preciously weighed out, and dissolved in a mixed solvent of acetone and dimethyl sulfoxide (4:1, by volume). A certain amount of 1 N-sodium hydroxide aqueous solution was added to the solution, and thereby the cellulose acylate in the solution was saponified at 25° C. for 2 hours. After phenolphthalein as an indicator was added, the excess sodium hydroxide was titrated with 1 N-sulfuric acid (concentration factor: F). Independently, blank test was carried out in the same manner. From the obtained data, the acetic acid content (%) was calculated according to the following formula:

$$\text{acetic acid content} = \{6.005 \times (B-A) \times F\}/W.$$

In the formula, A is the amount (ml) of 1 N-sulfuric acid used in the titration, B is the amount (ml) of 1 N-sulfuric acid used in the blanc test, F is the concentration factor of 1 N-sulfuric acid, and W is the weight of the sample.

In the case where the cellulose acylate contains two or more kinds of acyl groups, the amount of each group was estimated in consideration of each pKa value. Independently, the amount was measured by another method (described in T. Sei, K. Ishitani, R. Suzuki, K. Ikematsu, Polymer Journal, 17, 1065(1985)), and was compared with the above-obtained value to confirm that it was correct.

From the obtained acetic acid content and the amounts of other acyl groups, the substitution degree was calculated in consideration of molecular weight.
(1) Viscosity Average Degree of Polymerization (DP) of Cellulose Acylate About 0.2 g of absolutely dried cellulose acylate was preciously weighed out, and dissolved in 100 ml of a mixed solvent of methylene chloride and ethanol (9:1, by weight). The dropping time of the solution was measured at 25° C. by means of Ostwald's viscosity meter, and thereby the degree of polymerization was calculated according to the following formulas:

$$\eta\text{rel} = T/T0$$

$$[\eta] = (ln\eta\text{rel})/C$$

$$DP = [\eta]/Km$$

in which
T: dropping time of the sample (second),
T0: dropping time of the solvent alone (second),
C: concentration (g/l), and
Km: $6 \times 10^{-4}$.
(2) Transparency of Solution The prepared solutions or slurries were left at room temperature (23° C.), and observed and classified into the following four grades:
A: the solution was transparent and homogeneous,
B: the solution was slightly clouded, or a little amount of excess solute was seen, C: the solution was gel, or a considerable amount of excess solute was seen, and D: the liquid was not swelled and the solute was not dissolved, and the liquid was opaque and inhomogeneous.

(3) Surface of Film

The prepared films were observed to check the state of the surface. According to the observation, the prepared films were classified into the following four grades:

A: the film surface was smooth,

B: the film surface was smooth, but there were a few dregs on the surface,

C: the film surface was slightly rough, and there were some dregs on the surface, and D: the film surface was rough, and there were many dregs on the surface.

(4) Peeling of Film from Support

After the film was peeled from the support, the surface of the support was observed to check whether flakes of the cellulose acylate film remained or not. According to the observation, the prepared films were classified into the following four grades:

A: no flake of the film was observed,

B: a few flakes of the film were observed,

C: some flakes of the film were observed, and

D: many flakes of the film were observed.

(5) Lateral Unevenness (Simply Referred to as "Unevenness") of Film

The prepared films were observed to check defects of lateral unevenness. According to the observation, the prepared films were classified into the following four grades:

A: no defect of lateral unevenness was observed,

B: a few defects of lateral unevenness were observed,

C: some defects of lateral unevenness were observed, and

D: many defects of lateral unevenness were observed.

(6) Granular Structure of Film

The prepared films were observed to check a granular structure on the surface. According to the observation, the prepared films were classified into the following four grades:

A: no granular structure was observed on the surface,

B: a few granular structures were observed on the surface,

C: some granular structures were observed on the surface, and

D: many granular structures were observed on the surface.

(7) Haze of Film

The haze of each prepared film was measured by means of a haze meter (1001 DP type, Nippon Denshoku Kogyo Co., Ltd.).

(8) Bending Test for Film

Each prepared film was cut into a piece of 120 mm length, and the piece was repeatedly bent according to ISO 8776/2-1988 to determine the number of bending times repeated until the piece was broken.

(9) Stability of Solution

The prepared solutions or slurries were left at room temperature (23° C.) for 20 days, and observed and classified into the following four grades:

A: the solution was transparent and homogeneous,

B: the solution was slightly clouded, or a little amount of excess solute was seen, C: the solution was gel, or a considerable amount of excess solute was seen, and D: the liquid was not swelled and the solute was not dissolved, and the liquid was opaque and inhomogeneous.

EXAMPLE 1

(1-1) Preparation of Cellulose Acylate Solution

Cellulose acylate solutions were prepared according to the following two methods. The components of the solution prepared in each example or comparison example were shown in Table 1 in detail. To each solution, silica particles (size: 20 nm), triphenylphosphate/biphenyldiphenylphosphate (1/2, by weight) and 2,4-bis-(n-octylthio)-6-(4-hydroxy-3,5-di-tert-butylanilino)-1,3,5-triazine were added in the amounts of 0.5 wt. %, 10 wt. % and 1.0 wt. %, respectively, based on the amount of cellulose acylate. Further, releasing agents shown in Table 1 were added.

In the swelling step and the dissolving step, the temperature of solvent and the time for swelling were changed. Those conditions were also shown in Table 2 in detail.

(1-1a) Cooling Dissolution Method (Represented by "Cool" in Table 1)

To the solvent, each cellulose acylate shown in Table 1 was gradually added while stirred. The mixture was left at room temperature (25° C.) for 3 hours to swell. While moderately stirred, the swelled mixture was cooled to −30° C. at the rate of −8° C./minute and then further cooled to the temperature shown in Table 1. After kept at the temperature for 6 hours, the mixture was heated at the rate of +8° C./minute. When the mixture became a sol in a certain degree, it was started to stir the sol. The mixture was then heated to 50° C. to prepare a dope.

(1-1b) High Temperature-high Pressure Dissolution Method (Represented by "High" in Table 1)

To the solvent, each cellulose acylate shown in Table 1 was gradually added while stirred. The mixture was left at room temperature (25° C.) for 3 hours to swell. The swelled mixture was placed in a stainless steel-made airtight container having a dual structure. Highly pressured steam was led to the outer jacket of the container, and thereby the mixture was heated at the rate of +8° C./minute to the temperature shown in Table 1 and kept at the temperature for 5 minutes under 1 Mpa. Water at 50° C. was then led to the outer jacket to cool the mixture at the rate of −8° C./minute to 50° C. Thus, a dope was prepared.

(1-2) Filtration of Cellulose Acylate Solution

The prepared dope was filtrated at 50° C. through filter paper having the absolute filtration precision of 0.01 mm (#63, Toyo Filter Co., Ltd.), and then further filtrated through filter paper having the absolute filtration precision of 0.0025 mm (FHO25, Pole).

(1-3) Measurement of Viscosity and Preparation of Cellulose Acylate Film

The dope of (1-2) was cast with a simplified glass plate caster, and dried for 5 minutes. The formed film was then peeled from the glass plate, and further dried at 120° C. for 30 minutes. Thus, a cellulose acylate film was prepared.

With respect to peeling, the prepared films were classified into the following grades:

A: easily peeled,

B: a little force was needed to peel, and

C: such strong force as deformed the film was needed to peel.

As the releasing agents, the following compounds A (compound example 6 shown in Japanese Patent Provisional Publication No. 61(1986)-243837) and B (compound example 9 shown in Japanese Patent Provisional Publication No. 61(1986)-243837) were used.

TABLE 1

Compound A:

C₁₂H₂₅—O—P(=O)(ONa)—O—C₁₀H₂₁

Compound B:

C₁₆H₃₃—O—C₆H₄—O—(CH₂)₃—SO₃K (Preparation of dope)

| Dope | Cellulose acylate Acetyl Substitution Degree A | Acyl group | Acyl of C3 to C22 Substitution degree B | Degree of polymerization | Dissolution Method | Temp. | Solvent Non-Cl Kind | Ratio | Chlorinated Kind | Ratio | Alcohol Kind | Ratio | Releasing agent Kind | Amount (1) | Concentration of cellulose acylate (2) |
|---|---|---|---|---|---|---|---|---|---|---|---|---|---|---|---|
| Ex. 1 | 2.7 | — | 0 | 310 | Cool | −70° C. | MA/CH | 80/15 | None | None | MOL | 5 | Citric acid | 1 × 10⁻⁶ mol | 16 wt. % |
| Ex. 2 | 2.6 | Propionyl | 0.3 | 670 | Cool | −70° C. | MA/CP | 60/30 | None | None | MOL/POL | 5/5 | Tartaric acid | 2 × 10⁻⁶ mol | 19 wt. % |
| Ex. 3 | 2.7 | n-Butyryl | 0.1 | 440 | Heat | 160° C. | AC/AA | 75/10 | MC | 5 | MOL/EOL | 5/5 | Compound A | 5 × 10⁻⁶ mol | 20 wt. % |
| Ex. 4 | 2.7 | n-Butyryl | 0.1 | 440 | Heat | 160° C. | AC/AA | 75/10 | MC | 5 | MOL/EOL | 5/5 | Compound B | 5 × 10⁻⁶ mol | 20 wt. % |
| Ex. 5 | 2.7 | — | 0 | 310 | Cool | −70° C. | NA/CH | 80/15 | None | | MOL | 5 | Compound A | 2 × 10⁻⁵ mol | 16 wt. % |
| Comp. 1 | 2.7 | — | 0 | 310 | Cool | −70° C. | NA/CH | 80/15 | None | | MOL | 5 | None | | 16 wt. % |
| Comp. 2 | 2.7 | — | 0 | 310 | Cool | −70° C. | None | | MC | 95 | MOL | 5 | None | | 16 wt. % |

(Remarks)
MA: methyl acetate
CH: cyclohexane
AC: acetone
AA: methyl acetoacetate
CP: cyclopentanone
MC: dichloromethane
MOL: methanol
EOL: ethanol
POL: 1-propanol
CT: carbon tetrachloride,
HP: n-heptane
(1) The amount of the agent based on 1 g of cellulose acylate
(2) Weight ratio (%) of cellulose acylate to the total weight of the solution

(1-3) Results

The prepared cellulose acylate solutions and films were evaluated in the aforementioned manners, and as a result it was confirmed that the solutions and films of the invention had no problem with respect to stability of the solution, and mechanical and optical characters of the film. On the other hand, the films for comparison could not be peeled from the support, and there were some defects on the surface of the film.

Further, the films were subjected to MD or TD stretching by 10 to 30% at 130° C. online in the drying step of the production process or offline after the step, and thereby the retardation was increased by 40 to 160 nm in proportion to stretching ratio.

According to the simultaneous casting method described in Japanese Patent Provisional Publication No. 6(1994)-134993, the aforementioned dopes 1 and 2 were layered so that the dopes 1 and 2 might be on the band (support) side and on the air (open) side, respectively. The prepared film also gave satisfying results in the evaluation.

It was further confirmed that the prepared cellulose acyalte films were advantageously used in a liquid crystal display described in Example 1 of Japanese Patent Provisional Publication No. 10(1998)-48420, a discotic liquid crystal-containing optically anisotropic layer described in Example 1 of Japanese Patent Provisional Publication No. 9(1997)-26572, an orientation layer coated with polyvinyl alcohol, a liquid, crystal display of VA type shown in FIGS. 2 to 9 of Japanese Patent Provisional Publication No. 2000-154261, and a liquid crystal display of OCB type shown in FIGS. 10 to 15 of Japanese Patent Provisional Publication No. 2000-154261. The film were also advantageously used as a polarizing plate described in Japanese Patent Provisional Publication No. 54(1979)-016575.

TABLE 2

(Preparation and evaluation of film)

| Film | Stability | Surface | Haze | Peeling |
|---|---|---|---|---|
| Ex. 1 | A | A | 0.1% | A |
| Ex. 2 | A | A | 0.1% | A |
| Ex. 3 | A | A | 0.1% | A |
| Ex. 4 | A | A | 0.1% | A |
| Ex. 5 | A–B | A–B | 0.3% | A |
| Comp. 1 | A | B | 0.1% | C |
| Comp. 2 | A | C | 0.1% | C |

EXAMPLE 2

(1-1) Preparation of Cellulose Triacetate Solution

A cellulose triacetate solution was prepared in the following manner. In a 2L stainless steel-made dissolution tank equipped with a stirring propeller, a mixture consisting of the below-described components was placed. (The tank was beforehand washed well with methylene chloride.) With the mixture vigorously stirred, powder of cellulose triacetate (mean particle size: 2 mm) was gradually added to make the total weight 1 kg. The mixture was then left at room temperature (25° C.) for 3 hours, so as to swell the cellulose triacetate.

| | |
|---|---|
| Cellulose triacetate (substitution degree: 2.83, water content: 0.4 wt %, viscosity average degree of polymerization: 320, viscosity of 6 wt. % methylene chloride solution: 305 mPa · s) | 20 weight parts |
| Methyl acetate | 48 weight parts |
| Cyclopentanone | 10 weight parts |
| Methanol | 5 weight parts |
| Ethanol | 5 weight parts |
| Dipentaerythritol hexaacetate (plasticizer A) | 6 weight parts |
| Triphenyl phosphate (plasticizer B) | 6 weight parts |
| Silica fine particles (particle size: 20 nm) | 0.1 weight part |
| 2,4-Bis(n-octylthio)-6-(4-hydroxy-3,5-di-tert-butylanilino)-1,3,5-triazine (UV absorber a) | 0.1 weight part |
| 2-(2'-Hydroxy-3',5'-di-tert-butylphenyl)-5-chlorobenzotriazole (UV absorber b) | 0.1 weight part |
| 2-(2'-hydroxy-3',5'-di-tert-amylphenyl)-5-chlorobenzotriazole (UV absorber c) | 0.1 weight part |
| Releasing agent | set forth in Table 3 |

(1-2) Cellulose Triacetate Solution for Film

The obtained inhomogeneous solution in the form of gel was sent by means of a screw pump, to pass through a cooling path so that the liquid might be cooled at −70° C. for 3 minutes. The path was cooled with cryogenic liquid at −80° C. having been cooled with a freezer. The thus-cooled solution was transferred to a stainless steel-made container, and stirred at 50° C. for 2 hours. The solution was then introduced into a stainless steel-made pipe, where the liquid was heated and pressed to 110° C. and 1 Mpa. The heated and pressed solution was then filtrated through filter paper having the absolute filtration precision of 0.01 mm (#63, Toyo Filter Co., Ltd.), and then further filtrated through filter paper having the absolute filtration precision of 2.5 μm (FH025, Pole).

(1-3) Preparation of Cellulose Triacetate Film

The filtrated heated and pressed solution was cooled to 50° C. to prepare a cellulose triacetate dope. The dope was then cast onto a mirror surface of a stainless steel-made support. The temperature of the support was 10° C., and the casting speed was 3 m/minute. The width of the cast dope was 50 cm. The dope on the support was dried with air at 55° C. for 5 minutes. The formed film was peeled from the support (in this stage the solid content of the film was in the range of about 30 to 60 wt. %), and then dried at 110° C. for 10 minutes and further at 150° C. for 30 minutes (in this stage the temperature of the film was about 140° C.). Thus, a cellulose triacetate film (thickness: 80 μm) was prepared. In this preparation, all the above-prepared dope was used, and a skin of the dope was formed on the inside wall of the dissolution tank and pipes.

(1-4) Results

With respect to peeling and surface condition (unevenness, warts) of the films containing the releasing agents of the invention, the results of the evaluation were set forth in Table 3. As shown in Table 3, when peeled from the support, the control sample 1-1 (which contains no releasing agent) left many flakes on the support. Further, it was also inferior in terms of unevenness, striped traces and haze. In contrast, the samples of the invention 1-2 to 1-11 left no flake when peeled from the support, and had such excellent surfaces that unevenness and striped traces were not observed and that the haze was small.

TABLE 3

| Sample | | Releasing agent | | Peeling | Remaining | Film | | |
|---|---|---|---|---|---|---|---|---|
| No. | | Compound | Amount | Force | flakes | Unevenness | Granular | Haze |
| 1-1 | Control | None | | 60 g/cm | D | D | D | 5.2 |
| 1-2 | Invention | RZ-3 | 0.01 | 13 g/cm | D | B | A | 0.4 |
| 1-3 | Invention | RZ-3 | 0.05 | 9 g/cm | A | A | A | 0.3 |
| 1-4 | Invention | RZ-3 | 0.2 | 7 g/cm | A | A | A | 0.2 |
| 1-5 | Invention | RZ-3 | 1 | 6 g/cm | A | A | A | 0.2 |
| 1-6 | Invention | RZ-6 | 0.03 | 9 g/cm | A | A | A | 0.3 |
| 1-7 | Invention | RZ-6 | 0.1 | 9 g/cm | A | A | A | 0.3 |
| 1-8 | Invention | RZ-9 | 0.05 | 10 g/cm | A | A | A | 0.3 |
| 1-9 | Invention | RZ-10 | 0.05 | 11 g/cm | A | A | A | 0.3 |
| 1-10 | Invention | RZ-13 | 0.05 | 11 g/cm | A | A | A | 0.3 |
| 1-11 | Invention | RZ-13 | 0.1 | 8 g/cm | A | A | A | 0.3 |
| 1-12 | Invention | RZ-15 | 0.05 | 9 g/cm | A | A | A | 0.3 |

(Remark)
Amount: weight part

EXAMPLE 3

The process for preparing the sample 1-3 of Example 2 was repeated except that the cellulose triacetate solution of (1-2) was treated in the following manner, to prepare the sample 2-3.

The inhomogeneous cellulose triacetate solution of (1-2) in the form of gel was sent by means of a screw pump, to pass through a heating path heated and pressed at 180° C. and 1 Mpa, respectively. In the heating path, the solution was heated and pressed to 110° C. and 1 Mpa for 3 minutes, and then filtrated through filter paper having the absolute filtration precision of 0.01 mm (#63, Toyo Filter Co., Ltd.) and further filtrated through filter paper having the absolute filtration precision of 0.0025 mm (FHO25, Pole).
(2-1) Results The prepared sample 2-3 of the invention was excellent in filtration, and left no flake on the support when peeled off. Further, the film made of the sample was excellent in unevenness, warts and haze. Thus, it was confirmed that the present invention could give excellent cellulose acetate solutions and films by the high temperature-high pressure dissolution method as well as the solvent casting method.

EXAMPLE 4

The process for preparing the sample 1-3 of Example 2 was repeated except that neither the plasicizer A nor B was used, to prepare the sample 3-3. The sample left no flake on the support when peeled off. The film of the sample was classified as the grade A in terms of both unevenness and warts. The haze of the film was 0.3%, which was an excellent value. The results of the bending test were 103 times (sample 1-3) and 82 times (sample 3-3). Since the sample 3-3 contained no plasicizer, the bending strength of the sample 3-3 was slightly inferior. Although this inferiority practically causes no problem, this example indicates it is preferred for the film to contain a plasicizer.

EXAMPLE 5

The process for preparing the sample 1-3 of Example 2 was repeated except that any of the UV absorbers a, b and c was not used, to prepare the sample 4-3. The sample left no flake on the support when peeled off. The film of the sample was classified as the grade A on both unevenness and warts. The haze of the film was 0.3%, which was an excellent value.

The samples were subjected to light fading test, in which the samples were exposed to a xenon lump of 30,000 lux for 1 month. While the haze of the sample 1-3 after the test was 0.4%, that of the sample 4-3 was 0.6%. This result, therefore, indicates that it is preferred for the film to contain a UV absorber.

EXAMPLE 6

The process for preparing the sample 1-3 of Example 2 was repeated except that the fine particles of silica were not used, to prepare the sample 5-3. The sample left no flake on the support when peeled off. The film of the sample was classified as the grade A on both unevenness and warts. The haze of the film was 0.3%, which was an excellent value.

For testing slipperiness of the films, two of the same sample films were piled up and slid. As a result, while the films of the sample 1-3 were smoothly moved, those of the sample 5-3 were somewhat frictionally slid. This result, therefore, indicates that it is preferred for the film to contain fine particles.

EXAMPLE 7

The process for preparing the sample 1-3 of Example 2 was repeated except that the cellulose triacetate solution of (1-2) was treated in the following manner, to prepare the sample film 6-3.

Some amount of the cellulose triacetate solution obtained in (1-1) was collected and diluted with methyl acetate in the amount of 10 wt. % based on the total amount, to prepare another cellulose triacetate solution (solution A). According to Japanese Patent Provisional publication No. 06(1994)-134993, the prepared solution A and the cellulose triacetate solution of the sample 1-3 were cooperatively cast and layered so that the solution A might be outside (to form top and bottom layers) and that the solution 1-3 might be inside to be sandwiched between the layers of the solution A. The thus-prepared three-layered cellulose triacetate film had the total thickness of 40 μm, in which each outside layer and the inside layer had thickness of 3 μm and 34 μm, respectively.

The prepared film (sample 6-3) had a smoother surface than the sample 1-3, and hence it is preferred to perform the simultaneous casting method.

EXAMPLE 8
(1-1) Preparation of Cellulose Acylate Solution

Cellulose acylate solutions were prepared according to the following two methods. The components of the solution prepared in each example or comparison example were shown in Table 4 in detail. To each solution, silica particles (size: 20 nm), triphenylphosphate/biphenyldiphenylphosphate (1/2, by weight) and 2,4-bis-(n-octylthio)-6-(4-hydroxy-3,5-di-tert-butylanilino)-1,3,5-triazine were added in the amounts of 0.5 wt. %, 10 wt. % and 1.0 wt. %, respectively, based on the amount of cellulose acylate. Further, citric acid as a releasing agent was added in the amount of 200 ppm based on the amount of cellulose acylate. As the dopes for preparing the inner and outer layers, the solutions having different concentrations of cellulose acylate were used. The detailed compositions of the dopes were set forth in Table 4.

(1-1a) Cooling Dissolution Method (Represented by "Cool" in Table 4)

To the solvent, each cellulose acylate shown in Table 4 was gradually added while stirred. The mixture was left at room temperature (25° C.) for 3 hours to swell. While moderately stirred, the swelled mixture was cooled to −30° C. at the rate of −8° C./minute and then further cooled to the temperature shown in Table 4. After kept at the temperature for 6 hours, the mixture was heated at the rate of +8° C./minute. When the mixture became a sol in a certain degree, it was started to stir the sol. The mixture was then heated to 50° C. to prepare a dope.

(1-1b) High Temperature-high Pressure Dissolution Method (Represented by "High" in Table 4)

To the solvent, each cellulose acylate shown in Table 4 was gradually added while stirred. The mixture was left at room temperature (25° C.) for 3 hours to swell. The swelled mixture was placed in a stainless steel-made airtight container having a dual structure. Highly pressured steam (1 Mpa) was led to the outer jacket-of the container, and thereby the mixture was heated at the rate of +8° C./minute to the temperature shown in Table 4 and kept at the temperature for 5 minutes. Water at 50° C. was then led to the outer jacket to cool the mixture at the rate of −8° C./minute to 50° C. Thus, a dope was prepared.

(1-2) Filtration of Cellulose Acylate Solution

The prepared dope was filtrated at 50° C. through filter paper having the absolute filtration precision of 0.01 mm (#63, Toyo Filter Co., Ltd.), and then further filtrated through filter paper having the absolute filtration precision of 0.0025 mm (FHO25, Pole).

(1-3) Preparation of Cellulose Acylate Film

The solutions of (1-2) were cast by means of a casting machine (described Japanese Patent Provisional Publication No. 56(1981)-162617), and dried at 120° C. for 30 minutes to form a cellulose acylate film. The constitutions of the layered films were set forth in Table 4. While a two-layered film had a structure of an inner layer/an outer layer piled up in this order from the band (support) side, a three-layered film had a sandwich structure in which an outer layer/an inner layer/an outer layer were piled up in this order from the band (support).

TABLE 4

(Preparation of dope)

| | Cellulose acylate | | | |
|---|---|---|---|---|
| | Acetyl | Acyl of C3 to C22 | | |
| Dope | Substitution degree A | Acyl group | Substitution degree B | Degree of polymerization |
| Ex. 1 | 2.7 | — | 0 | 310 |
| Ex. 2 | 2.6 | Propionyl | 0.3 | 670 |
| Ex. 3 | 2.7 | n-Butyryl | 0.1 | 440 |
| Ex. 4 | 2.7 | n-Butyryl | 0.1 | 440 |
| Ex. 5 | 2.7 | — | 0 | 310 |

| | | | Solvent | | | | |
|---|---|---|---|---|---|---|---|
| | Dissolution | | Non-Cl | | Chlorinated | | Alcohol |
| Dope | Method | Temp. | Kind | Ratio | Kind | Ratio | Kind | Ratio |
| Ex. 1 | Cool | −70° C. | MA/CH | 80/15 | None | | MOL | 5 |
| Ex. 2 | Cool | −70° C. | MA/CP | 60/30 | None | | MOL/POL | 5/5 |
| Ex. 3 | Heat | 160° C. | AC/AA | 75/10 | MC | 5 | MOL/EOL | 5/5 |
| Ex. 4 | Heat | 160° C. | AC/AA | 80/10 | None | | MOL/EOL | 5/5 |
| Ex. 5 | Cool | −70° C. | MA/CH | 80/15 | None | | MOL | 5 |

(Remark)
MA: methyl acetate
CH: cyclohexane
AC: acetone
AA: methyl acetoacetate
CP: cyclopentanone
MC: dichloromethane
MOL: methanol
EOL: ethanol
POL: 1-propanol
CT: carbon tetrachloride,
HP: n-heptane

| Film | Number of layers | Inner layer | | Outer layer | |
|---|---|---|---|---|---|
| | | Concentration | Thickness | Concentration | Thickness |
| Ex. 1 | 2 | 16.0 wt. % | 50 μm | 16.0 wt. % | 50 μm |
| Ex. 2 | 2 | 19.0 wt. % | 30 μm | 18.5 wt. % | 50 μm |
| Ex. 3 | 3 | 20.0 wt. % | 50 μm | 19.8 wt. % | 20 + 20 μm |
| Ex. 4 | 3 | 20.0 wt. % | 70 μm | 18.0 wt. % | 5 + 5 μm |
| Ex. 5 | 3 | 16.0 wt. % | 60 μm | 14.2 wt. % | 15 + 15 μm |

Remarks:
Concentration: weight ratio (%) of cellulose acylate to the total weight of the solution (1-4) Results The prepared cellulose acylate solutions and films were evaluated in the aforementioned manners, and as a result it was confirmed that the solutions and films of the invention had no problem with respect to stability of the solution, and mechanical and optical characters of the film.

Further, the films were subjected to MD or TD stretching by 10 to 30% at 130° C. online in the drying step of the production process or offline after the step, and thereby the retardation was increased by 40 to 160 nm in proportion to stretching ratio.

It was confirmed that the prepared cellulose acyalte films were advantageously used in a liquid crystal display described in Example 1 of Japanese Patent Provisional Publication No. 10(1998)-48420, a discotic liquid crystal-containing optically anisotropic layer described in Example 1 of Japanese Patent Provisional Publication No. 9(1997)-26572, an orientation layer coated with polyvinyl alcohol, a liquid crystal display of VA type shown in FIGS. 2 to 9 of Japanese Patent Provisional Publication No. 2000-154261, and a liquid crystal display of OCB type shown in FIGS. 10 to 15 of Japanese Patent Provisional Publication No. 2000-154261. The film were also advantageously used as a polarizing plate described in Japanese Patent Provisional Publication No. 54(1979)-016575.

TABLE 5

(Preparation and evaluation of film)

| Film | Stability | Film surface | Haze |
|---|---|---|---|
| Ex. 1 | A–B | B | 0.1% |
| Ex. 2 | A | A–B | 0.1% |
| Ex. 3 | A | A–B | 0.1% |
| Ex. 4 | A | A | 0.1% |
| Ex. 5 | A–B | B | 0.3% |

EXAMPLE 9

An elliptically polarizing plate was produced in the manner described in Japanese Patent Provisional Publication No. 11(1999)-316378 as Example 1, except that the cellulose triacetate film (second film, thickness: 100 μm) of the sample 1-3 in Example 2 was used as the first transparent support, to prepare the sample 7-3. The thus produced polarizing plate had excellent optical characters. This indicates that it is preferred to use a particular detergent solution in the production process of cellulose acylate film because the thus-produced film is preferably used for an optically polarizing plate.

EXAMPLE 10

An optical compensatory sheet was produced in the manner described in Japanese Patent Provisional Publication No. 7(1995)-333433 as Example 1, except that the cellulose triacetate film available from Fuji Photo film Co., Ltd. was replaced with the cellulose triacetate film of the sample 1-3 in Example 2. The obtained sheet gave excellent up-and-down and right-and-left viewing angles. This indicates that the cellulose triacetate film of the invention is also preferably used for optical devices.

EXAMPLE 11

The cellulose triacetate film of the sample 1-3 was used in a liquid crystal display described in Example 1 of Japanese Patent Provisional Publication No. 10(1998)-48420, a discotic liquid crystal-containing optically anisotropic layer described in Example 1 of Japanese Patent Provisional Publication No. 9(1997)-26572, an orientation layer coated with polyvinyl alcohol, a liquid crystal display of VA type shown in FIGS. 2 to 9 of Japanese Patent Provisional Publication No. 2000-154261, and a liquid crystal display of OCB type shown in FIGS. 10 to 15 of Japanese Patent Provisional Publication No. 2000-154261. All the thus-produced devices gave good performances.

EXAMPLE 12

The process for preparing the sample 1-3 of Example 2 was repeated except that the thickness of the film was made 120 μm, to prepare the sample 10-3.

On one surface of the formed film, the first and second backing layers described in Example 1 of Japanese Patent Provisional Publication No. 4(1992)-73736 were provided. The formed backing layers contained an electric conductive cationic polymer. On the other surface, the sample 105 described in Example 1 of Japanese Patent Provisional Publication No. 11(1999)-38568 was applied. Thus, a silver halide color photographic material was produced. The thus-produced photographic material could be easily treated to give excellent images.

EXAMPLE 13

The process for preparing the sample 1-3 of Example 2 was repeated, except that 48 weight parts of methyl acetate and 10 weight parts of cyclopentanone in the cellulose triacetate solution (1-1) were replaced with 58 weight parts of methylene chloride, to prepare the sample 11-3. The prepared sample film 11-3 was classified as grades A, B and C in terms of remaining flakes in peeling, unevenness and warts, respectively. This indicates that it is preferred to use non-chlorinated solvents for preparing the film of the invention.

What is claimed is:

1. A solution of cellulose acylate dissolved in an essentially non-chlorinated solvent, wherein the essentially non-chlorinated solvent is a mixture of a ketone and an ester, said ketone having a solubility parameter of 19 to 21, said ester having a solubility parameter of 19 to 21, and said solution further containing a releasing agent, and wherein the releasing agent is a compound represented by the following formula (1) or (2):

$(R1\text{-}B1\text{-}O)_{n1}\text{-}P(=O)\text{-}(OM1)_{n2}$ (1)

$R2\text{-}B2\text{-}X$ (2)

in which each of R1 and R2 is independently a non-substituted alkyl or alkenyl group having 8 to 40 carbon atoms; M1 is an alkali metal, an ammonium or a lower alkylamine; each of B1 and B2 is independently a divalent linking group selected from the group consisting of an alkylene group having 1 to 10 carbon atoms, a polyoxyethylene having polymerization degree of 1 to 50, a polyoxypropylene having polymerization degree of 1 to 50, a polyoxyglycerin having polymerization degree of 1 to 50, and a combination thereof; X is a sulfonic acid, a salt thereof, a sulfuric ester or a salt thereof; n1 is 1 or 2; and n2 is 3-n1.

2. The solution of cellulose acylate as defined in claim 1, wherein the essentially non-chlorinated solvent furthermore contains an alcohol in an amount of 2 to 30 wt. %.

3. The solution of cellulose acylate as defined in claim 2, wherein the ketone is selected from the group consisting of acetone, methyl ethyl ketone, cyclopentanone and cyclohexanone, the ester is selected from the group consisting of methyl formate, ethyl formate and methyl acetate, and the alcohol has 1 to 6 carbon atoms.

4. The solution of cellulose acylate as defined in claim 2, wherein the essentially non-chlorinated solvent consists of solvents selected from the group consisting of the ketone, the ester and the alcohol.

5. The solution of cellulose acylate as defined in claim 1, wherein the releasing agent is an acid having an acid dissociation constant of not more than 4.50 in water or its salt with an alkali metal or an alkaline earth metal.

6. The solution of cellulose acylate as defined in claim 5, wherein the acid dissociation constant in water is in the range of 1.93 to 4.50.

7. The solution of cellulose acylate as defined in claim 5, wherein the releasing agent is contained in an amount of $1 \times 10^{-9}$ to $3 \times 10^{-5}$ mol based on 1 g of cellulose acylate.

8. The solution of cellulose acylate as defined in claim 1, wherein the releasing agent represented by the formula (1) or (2) is contained in an amount of 0.002 to 2 wt. %.

9. A process for preparation of cellulose acylate film, wherein a film is formed from a solution of cellulose acylate dissolved in an essentially non-chlorinated solvent, said essentially non-chlorinated solvent being a mixture of a ketone and an ester, said ketone having a solubility parameter of 19 to 21, said ester having a solubility parameter of 19 to 21, and said solution further containing a releasing agent, wherein the releasing agent is a compound represented by the following formula (1) or (2):

$$(R1\text{-}B1\text{-}O)_{n1}-P(=O)\text{-}(OM1)_{n2} \tag{1}$$

$$R2\text{-}B2\text{-}X \tag{2}$$

in which each of R1 and R2 is independently a non-substituted alkyl or alkenyl group having 8 to 40 carbon atoms; M1 is an alkali metal, an ammonium or a lower alkylamine; each of B1 and B2 is independently a divalent linking group selected from the group consisting of an alkylene group having 1 to 10 carbon atoms, a polyoxyethylene having polymerization degree of 1 to 50, a polyoxypropylene having polymerization degree of 1 to 50, a polyoxyglycerin having polymerization degree of 1 to 50, and a combination thereof; X is a sulfonic acid, a salt thereof, a sulfuric ester or a salt thereof; n1 is 1 or 2; and n2 is 3-n1.

10. The process for the preparation of cellulose acylate film as defined in claim 9, wherein cellulose acylate is dissolved in the non-chlorinated solvent at a temperature of −80 to −100° C.

11. The process for the preparation of cellulose acylate film as defined in claim 9, wherein cellulose acylate is dissolved in the non-chlorinated solvent at a temperature of 80 to 220° C.

12. The process for the preparation of cellulose acylate film as defined in claim 9, wherein a film having two or more layers is formed from the solution of cellulose acylate and at least another kind of cellulose acylate solution according to a simultaneous casting method.

13. The process for the preparation of cellulose acylate film as defined in claim 12, wherein a film having three or more layers is formed from the solution of cellulose acylate and at least two other kinds of cellulose acylate solution according to the simultaneous casting method.

14. The process for the preparation of cellulose acylate film as defined in claim 13, wherein the solution for forming the surface layer has a cellulose acylate concentration not higher than those for the inner layers.

15. The process for the preparation of cellulose acylate film as defined in claim 14, wherein the ratio of the cellulose acylate concentration of the solution for the surface layer to the concentrations of those for the inner layers is in the range of 0.99 to 0.80.

* * * * *